US012810589B2

(12) United States Patent
Schulter et al.

(10) Patent No.: US 12,810,589 B2
(45) Date of Patent: Nov. 24, 2026

(54) VISUAL OBJECT DETECTION USING EXPLICIT NEGATIVES

(71) Applicant: NEC Laboratories America, Inc., Princeton, NJ (US)

(72) Inventors: Samuel Schulter, Long Island City, NY (US); Vijay Kumar Baikampady Gopalkrishna, Santa Clara, CA (US); Yumin Suh, Santa Clara, CA (US)

(73) Assignee: NEC Corporation, Tokyo (JP)

( * ) Notice: Subject to any disclaimer, the term of this patent is extended or adjusted under 35 U.S.C. 154(b) by 230 days.

(21) Appl. No.: 18/905,651

(22) Filed: Oct. 3, 2024

(65) Prior Publication Data

US 2025/0118053 A1 Apr. 10, 2025

Related U.S. Application Data

(60) Provisional application No. 63/542,395, filed on Oct. 4, 2023.

(51) Int. Cl.
*G06V 10/77* (2022.01)
*G06F 40/40* (2020.01)
(Continued)

(52) U.S. Cl.
CPC .............. *G06V 10/77* (2022.01); *G06F 40/40* (2020.01); *G06N 5/02* (2013.01); *G06V 10/764* (2022.01); *G06V 20/58* (2022.01); *G06V 20/70* (2022.01)

(58) Field of Classification Search
CPC ...... G06V 10/77; G06V 10/764; G06V 20/58; G06V 20/70; G06N 5/02; G06F 40/40
See application file for complete search history.

(56) References Cited

U.S. PATENT DOCUMENTS 12,333,389 B2 * 6/2025 Zhu .......................... G06N 3/09
2020/0151448 A1 5/2020 Lin et al.
(Continued)

FOREIGN PATENT DOCUMENTS

KR 20230064011 A 5/2023

OTHER PUBLICATIONS

International Search Report from PCT/US24/49994 dated Jan. 14, 2025. (9 pages).

*Primary Examiner* — Daniel G Mariam
(74) *Attorney, Agent, or Firm* — Vincent Duffy

(57) ABSTRACT

Systems and methods for visual object detection using explicit negatives. To train an artificial intelligence model with explicit negatives, a data sampler can sample input data from a language-based dataset to select images with annotations. A negative generation engine can generate explicit negatives representing sentences that include contradicting words that are semantically related to the annotations by using an external knowledgebase. A model trainer can minimize the classification loss of positive labels while decreasing the confidence score of the explicit negatives for the artificial intelligence model. The negative generation engine can be optimized to generate next explicit negatives. The artificial intelligence model can backpropagate using positive labels and the next explicit negatives to generate supervisory loss corresponding to the net explicit negatives. The artificial intelligence model can detect objects from an input image.

20 Claims, 5 Drawing Sheets

(51) Int. Cl.

| | |
|---|---|
| ***G06N 5/02*** | (2023.01) |
| ***G06V 10/764*** | (2022.01) |
| ***G06V 20/58*** | (2022.01) |
| ***G06V 20/70*** | (2022.01) |

(56) References Cited

U.S. PATENT DOCUMENTS

| | | | |
|---|---|---|---|
| 2021/0295108 A1 | 9/2021 | Bar et al. | |
| 2022/0375189 A1 | 11/2022 | Beye et al. | |
| 2023/0169150 A1 | 6/2023 | Ha et al. | |
| 2024/0420239 A1* | 12/2024 | Chen ...................... | G06Q 40/06 |

* cited by examiner

VISUAL OBJECT DETECTION USING EXPLICIT NEGATIVES

RELATED APPLICATION INFORMATION

This application claims priority to U.S. Provisional App. No. 63/542,395 filed on Oct. 4, 2023, incorporated herein by reference in its entirety.

BACKGROUND

Technical Field

The present invention relates to object detection using artificial intelligence models, and more particularly to visual object detection using explicit negatives.

Description of the Related Art

Artificial intelligence (AI) models have improved dramatically over the years especially in entity detection, scene reconstruction, and scene understanding. However, training AI models is time and resource intensive. Alleviating such drawbacks is still a persistent challenge in the realm of artificial intelligence.

SUMMARY

According to an aspect of the present invention, a computer-implemented method is provided for visual object detection using explicit negatives, including sampling images with annotations from a language-based dataset using a data sampler, generating, using a negative generation engine, explicit negatives representing sentences that include contradicting words that are semantically related to the annotations by using an external knowledgebase, minimizing a classification loss of positive labels while decreasing a confidence score of the explicit negatives for an artificial intelligence model, backpropagating using the positive labels and next explicit negatives generated by an optimized negative generation engine to generate supervisory loss corresponding to the next explicit negatives for the artificial intelligence model, and detecting objects from an input image using the artificial intelligence model.

According to another aspect of the present invention, a system is provided for visual object detection using explicit negatives, including, a memory device; and one or more processor devices operatively coupled with the memory device to sample images with annotations from a language-based dataset using a data sampler, generate, using a negative generation engine, explicit negatives representing sentences that include contradicting words that are semantically related to the annotations by using an external knowledgebase, minimize a classification loss of positive labels while decreasing a confidence score of the explicit negatives for an artificial intelligence model, backpropagate using the positive labels and next explicit negatives generated by an optimized negative generation engine to generate supervisory loss corresponding to the next explicit negatives for the artificial intelligence model, and detect objects from an input image using the artificial intelligence model.

According to yet another aspect of the present invention, a non-transitory computer program product is provided including a computer-readable storage medium having program code visual object detection using explicit negatives, wherein the program code when executed on a computer causes the computer to sample images with annotations from a language-based dataset using a data sampler, generate, using a negative generation engine, explicit negatives representing sentences that include contradicting words that are semantically related to the annotations by using an external knowledgebase, minimize the classification loss of positive labels while decreasing the confidence score of the explicit negatives for an artificial intelligence model, backpropagate using the positive labels and the next explicit negatives generated by an optimized negative generation engine to generate supervisory loss corresponding to the next explicit negatives for the artificial intelligence model, and detect objects from an input image using the artificial intelligence model.

These and other features and advantages will become apparent from the following detailed description of illustrative embodiments thereof, which is to be read in connection with the accompanying drawings.

BRIEF DESCRIPTION OF DRAWINGS

The disclosure will provide details in the following description of preferred embodiments with reference to the following figures wherein.

DETAILED DESCRIPTION OF PREFERRED EMBODIMENTS

Figure 1:
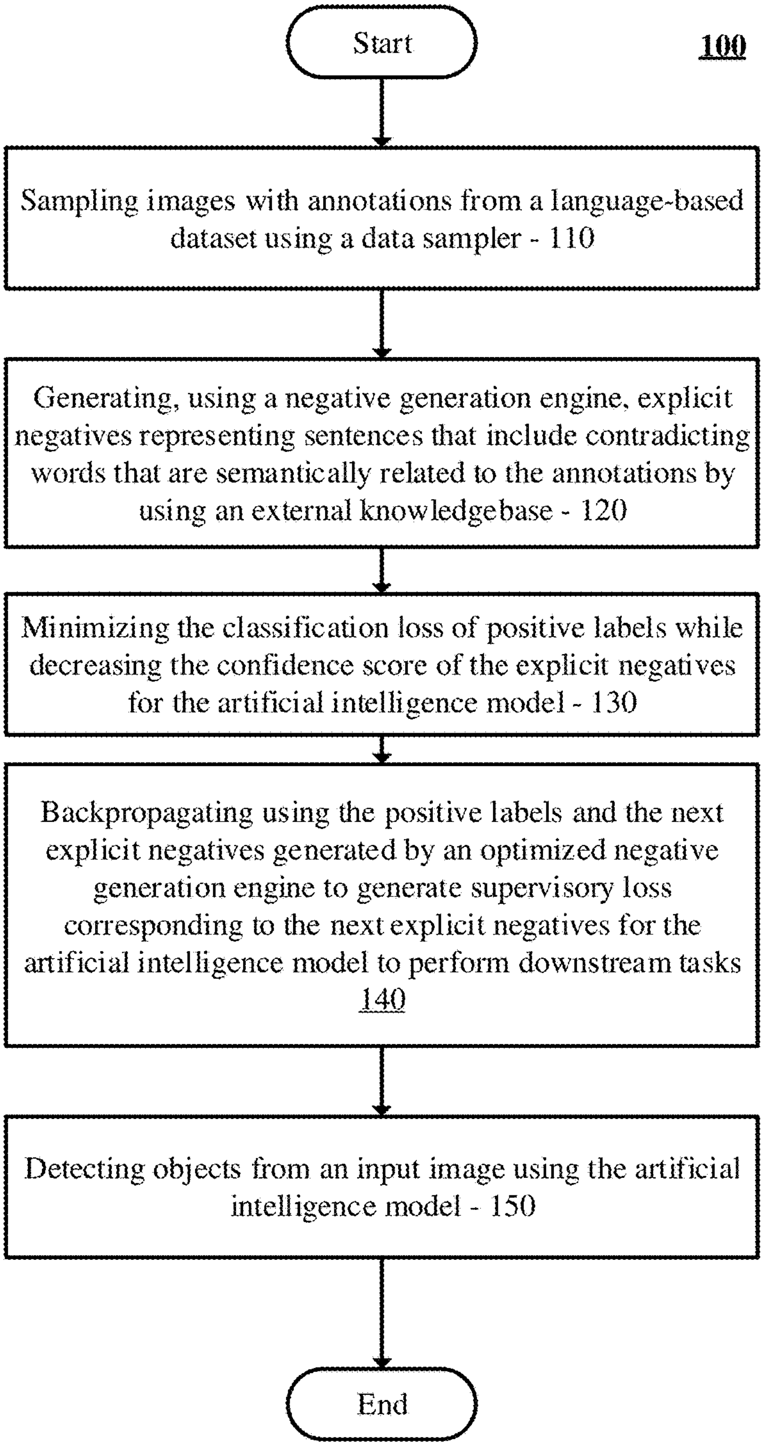
FIG. 1 is a flow diagram illustrating a high-level overview of a method for visual object detection using explicit negatives, in accordance with an embodiment of the present invention.

In accordance with embodiments of the present invention, systems and methods are provided for visual object detection with explicit negatives. Visual object detection consists of two tasks, localizing objects in an image and classifying them into a semantic category. The present embodiments improve classification models with supervised learning via gradient-based optimization through annotated images.

In an embodiment, an artificial intelligence model can be trained more efficiently with explicit negatives. To train an artificial intelligence model with explicit negatives, a data sampler can sample input data from a language-based dataset to select images with annotations. A negative generation engine can generate explicit negatives representing sentences that include contradicting words that are semantically related to the annotations by using an external knowledgebase. A model trainer can minimize the classification loss of positive labels while decreasing the confidence score of the explicit negatives for the artificial intelligence model. The negative generation engine can be optimized to generate next explicit negatives. The artificial intelligence model can backpropagate using positive labels and the next explicit negatives to generate supervisory loss corresponding to the net explicit negatives. The trained artificial intelligence model can detect and classify objects from an input scene which can be used in several downstream tasks such as scene understanding, trajectory generation, automated driving, etc.

In an embodiment, a vehicle can be controlled based on a generated trajectory that considers detected objects for a traffic scene simulated using the trained artificial intelligence model. In another embodiment, an entity can be located from an image by using a textual prompt.

In supervised training, the AI model is told what semantic category an image captures and it is also told what a semantic category the image does not capture. For example, a dataset annotates twenty categories. Then, given an image I, a bounding box b, which outlines the location of the object, and a ground truth semantic class c, the classifier of the object detector is taught to identify the object at bounding box b in image I as class c. The loss functions for gradient-based training are configured such that the model is taught to increase a confidence score for class c, while at the same time decreasing the confidence score for all other classes. The second part, decreasing confidences for all other classes, is equally important as increasing the score for the correct class. The "other classes" are considered negatives for the given object at bounding box b.

Standard object detection datasets have fixed set of categories, C, that were annotated. And each bounding box is assigned one semantic category, exclusively. In this case, it is easy to tell what the negatives are for each ground truth bounding box. If the ground truth has semantic category c, then the negatives are all classes from C except c.

For language-based detectors, there is no fixed label space. Annotations are free-form text that describe the object uniquely in an image. For example, given an image of two persons, one wearing a red shirt, the other a white shirt, the image might contain two ground truth bounding boxes, where one of them is associated with a free-from text that reads "Person wearing a red shirt". Now, given that there is no fixed label space (one can think that C is infinite), the question arises how we define negatives in such a case. This question is the matter of this invention.

Existing solutions create negatives for one object by random sampling from other object descriptions. A typical dataset contains many (e.g., thousands to hundred thousand or more) images, each with multiple bounding box annotations and corresponding descriptions. Other models define the negatives as the object descriptions of all other objects in the same image. Other models can also define negatives as randomly chosen from object descriptions in other images of the dataset.

The present embodiments introduce a method to generate explicit negatives (e.g., incorrect object descriptions). The present embodiments can use external knowledge to turn a positive object description (e.g. label) into a negative one by creating contradicting sentences. For example, if the description of an object in an image reads "A dog sitting on the bench", contradicting sentences can include "A cat sitting on the bench", "A dog sitting under the bench", "A dog sitting on the car", "A dog jumping onto the bench", etc.

Generating negatives as contradicting sentences to the positive label is beneficial because the negatives are typically more complicated to discriminate than the negative descriptions that other classifiers use, thus, improving accuracy and efficiency of the models. For example, if the positive label is "A dog sitting on the bench", a randomly chosen negative (even from the same image) can contain semantically entirely different words, like "An elephant in the water" or "A brown window."

By retaining the semantic relevance of the contradicting words of the explicit negatives, the negatives would be harder to discriminate from the positive labels which in turn, improves the accuracy and efficiency of the AI models for visual object detection.

Embodiments described herein may be entirely hardware, entirely software or including both hardware and software elements. In a preferred embodiment, the present invention is implemented in software, which includes but is not limited to firmware, resident software, microcode, etc.

Embodiments may include a computer program product accessible from a computer-usable or computer-readable medium providing program code for use by or in connection with a computer or any instruction execution system. A computer-usable or computer readable medium may include any apparatus that stores, communicates, propagates, or transports the program for use by or in connection with the instruction execution system, apparatus, or device. The medium can be magnetic, optical, electronic, electromagnetic, infrared, or semiconductor system (or apparatus or device) or a propagation medium. The medium may include a computer-readable storage medium such as a semiconductor or solid state memory, magnetic tape, a removable computer diskette, a random access memory (RAM), a read-only memory (ROM), a rigid magnetic disk and an optical disk, etc.

Each computer program may be tangibly stored in a machine-readable storage media or device (e.g., program memory or magnetic disk) readable by a general or special purpose programmable computer, for configuring and controlling operation of a computer when the storage media or device is read by the computer to perform the procedures described herein. The inventive system may also be considered to be embodied in a computer-readable storage medium, configured with a computer program, where the storage medium so configured causes a computer to operate in a specific and predefined manner to perform the functions described herein.

A data processing system suitable for storing and/or executing program code may include at least one processor coupled directly or indirectly to memory elements through a system bus. The memory elements can include local memory employed during actual execution of the program code, bulk storage, and cache memories which provide temporary storage of at least some program code to reduce the number of times code is retrieved from bulk storage during execution. Input/output or I/O devices (including but not limited to keyboards, displays, pointing devices, etc.) may be coupled to the system either directly or through intervening I/O controllers.

Network adapters may also be coupled to the system to enable the data processing system to become coupled to other data processing systems or remote printers or storage devices through intervening private or public networks. Modems, cable modem and Ethernet cards are just a few of the currently available types of network adapters.

Referring now in detail to the figures in which like numerals represent the same or similar elements and initially to FIG. 1, a high-level overview of a computer-implemented method for visual object detection using explicit negatives is illustratively depicted in accordance with one embodiment of the present invention.

In an embodiment, an artificial intelligence model can be trained more efficiently with explicit negatives. To train an artificial intelligence model with explicit negatives, a data sampler can sample input data from a language-based dataset to select images with annotations. A negative generation engine can generate explicit negatives representing sentences that include contradicting words that are semantically related to the annotations by using an external knowledge-base. A model trainer can minimize the classification loss of positive labels while decreasing the confidence score of the explicit negatives for the artificial intelligence model. The negative generation engine can be optimized to generate next explicit negatives. The artificial intelligence model can backpropagate using positive labels and the next explicit negatives to generate supervisory loss corresponding to the net explicit negatives. The trained artificial intelligence model can detect and classify objects from an input scene which can be used in several downstream tasks such as scene understanding, trajectory generation, automated driving, etc.

Referring now to block 110 of FIG. 1 where an embodiment is described showing a method of sampling images with annotations from a language-based dataset using a data sampler.

A language-based dataset for object detection can include a set of images. Each image has a corresponding annotation. An annotation can include a list of bounding boxes that outline some objects in the scenes, along with a free-form text description that uniquely describes that object (or multiple objects). For instance, "Person wearing red shirt" can refer to one or multiple persons in the image, but not all of them.

Random selection of images can be employed to sample images from the language-based dataset.

A simple random selection of a single image (along with ground truth annotations), which is then used for training the object detection model. The object detector is based on neural networks, which are trained with stochastic gradient descent, which update the model in many iterations, each computed from one or a few individual images.

Referring now to block 120 of FIG. 1 where an embodiment is described showing a method of generating, using a negative generation engine, explicit negatives representing sentences that include contradicting words that are semantically related to the annotations by using an external knowledgebase.

Distinguishing negative categories (e.g., explicit negatives) is an element in training classification modules in general, which is difficult or ambiguous for language-based detectors. Existing methods randomly sample object descriptions from other images, with the assumption that these texts are indeed negatives for a given image. The present embodiments can use external knowledge to create explicit negatives based on a given "positive" text.

The general knowledge base can include common sense facts about the world, for example, that the colors red and green are different. Knowing common sense facts allows the negative generation module to turn an object description like "Red car" into "Green car".

In an embodiment, general knowledge can be obtained from generated knowledge graph from datasets. General knowledge can be collected through various (also publicly available) services like WordNet® or ConceptNet. To leverage this data and generate knowledge graphs, the present embodiments can take a string that represents an object description and apply Part-Of-Speech (POS) tagging, a common Natural Language Processing (NLP) tool that returns for each word whether it is a noun, a verb, an adjective, or a punctuation, etc. In an embodiment, POS tagging can be performed with predefined linguistic rules and dictionaries. In another embodiment, POS tagging can be performed with a neural network that learns the syntactic roles of input tokens (e.g., words, punctuation, etc.). With this knowledge, the knowledge graph can be generated to search for contradicting words. In another embodiment, the knowledge base can include predefined knowledge graphs with semantic relevance.

For example, WordNet® has a hierarchical structure of semantic relevance, where for example the word "green" is under the term "color". One way to get a contradicting word is, therefore, to go to the parent node of a word, and find any other children of the parent via random sampling. Other knowledge bases are defined as knowledge graphs and explicitly link to contradicting words.

In another embodiment, the general knowledge can be extracted by Large-language-models (LLM) with instruction-tuning. LLMs are neural networks that are trained on immense quantities of text data from all over the internet. These models effectively compress common knowledge into a neural network. Instruction-tuning can train such models to follow instructions given by free-form text inputs. Hence, one can prompt LLMs like ChatGPT™ with explicit prompts like "Given a sentence, return another sentence that semantically contradicts the input by changing the text minimally, for example by changing one word. Here is the input sentence: <template>". The instruction prompt can be automatically generated through a neural network using prompt templates. The prompt templates can be obtained from a database, past prompts, external knowledgebase, etc.

Referring now to block 130 of FIG. 1 where an embodiment is described showing a method of minimizing the classification loss of positive labels while decreasing the confidence score of the explicit negatives for the artificial intelligence model.

In an embodiment, the artificial intelligence model can perform object detection. The object detection model is based on neural networks. Any common object detection architecture can be used as base such as a region-based convolutional neural network (RCNN), single-stage detectors, etc.

For a language-based object detector, the final classification layer, which is a simple linear layer in a neural network, is replaced with a linear layer that projects the features into an embedding space that has a specific dimensionality. This dimensionality is predefined by the dimensionality of the output of a text-encoder network, which can take any arbitrary free-form text as input and outputs a fixed-length real-valued vector. The dot product between the visual features and the text features defines the scores (logits) for the pair of visual feature and a free-form text. A typical object detector can output a set of visual features from one input image, each feature corresponding to an object in the image. While other losses are involved in training object detection models, the classification loss is relevant for the invention. Each visual feature (for each object) is compared with object descriptions (text inputs going through the text encoder). One of the object descriptions is correct, the others are incorrect. Determining the correct descriptions (e.g., positive labels) can be computed based on all predicted and ground truth locations, assigning the predictions with the ground truth. The dot product between visual and text features gives logits. These logits and the ground truth class are input to a classification loss function, like Cross-Entropy or Binary Cross-Entropy.

Referring now to block 140 of FIG. 1 where an embodiment is described showing a method of backpropagating using the positive labels and the next explicit negatives generated by an optimized negative generation engine to generate supervisory loss corresponding to the next explicit negatives for the artificial intelligence model.

During training, the artificial intelligence model and the negative generation engine can be updated together. The artificial intelligence model is trained to minimize classification loss. The negative generation engine can be updated through adversarial negative example generation so that next explicit negatives increase the detection loss when fed to the AI model.

Given a sample number of next explicit negatives, the AI model gets more supervisory loss (e.g., loss signals) from backpropagation of loss. The AI model would have a lower classification score due to the diverse and more complex nature of the next explicit negatives. For example, if the AI model correctly distinguishes three out of four explicit negatives which would generate only one supervisory loss corresponding to the explicit negative. With the next explicit negatives, the AI model would correctly distinguish one out of four explicit negatives which would generate three supervisory loss corresponding to the next explicit negatives making backpropagation more diverse and informative.

The trained AI model can be employed for downstream tasks such as fine-grained object detection, scene understanding, trajectory generation, entity identification, etc.

Referring now to block 150 of FIG. 1 where an embodiment is described showing a method of detecting objects from an input image using the AI model.

The input image can include objects that have object attributes such as color, size, spatial relationships with other objects, etc. The AI model is trained using explicit negatives of the objects within the input image which improved the accuracy of the AI model. After detecting objects from an input image, downstream tasks can be done such as fine-grained object detection, scene understanding, trajectory generation, entity identification, etc. This is further described in detail in FIG. 4.

Figure 4:
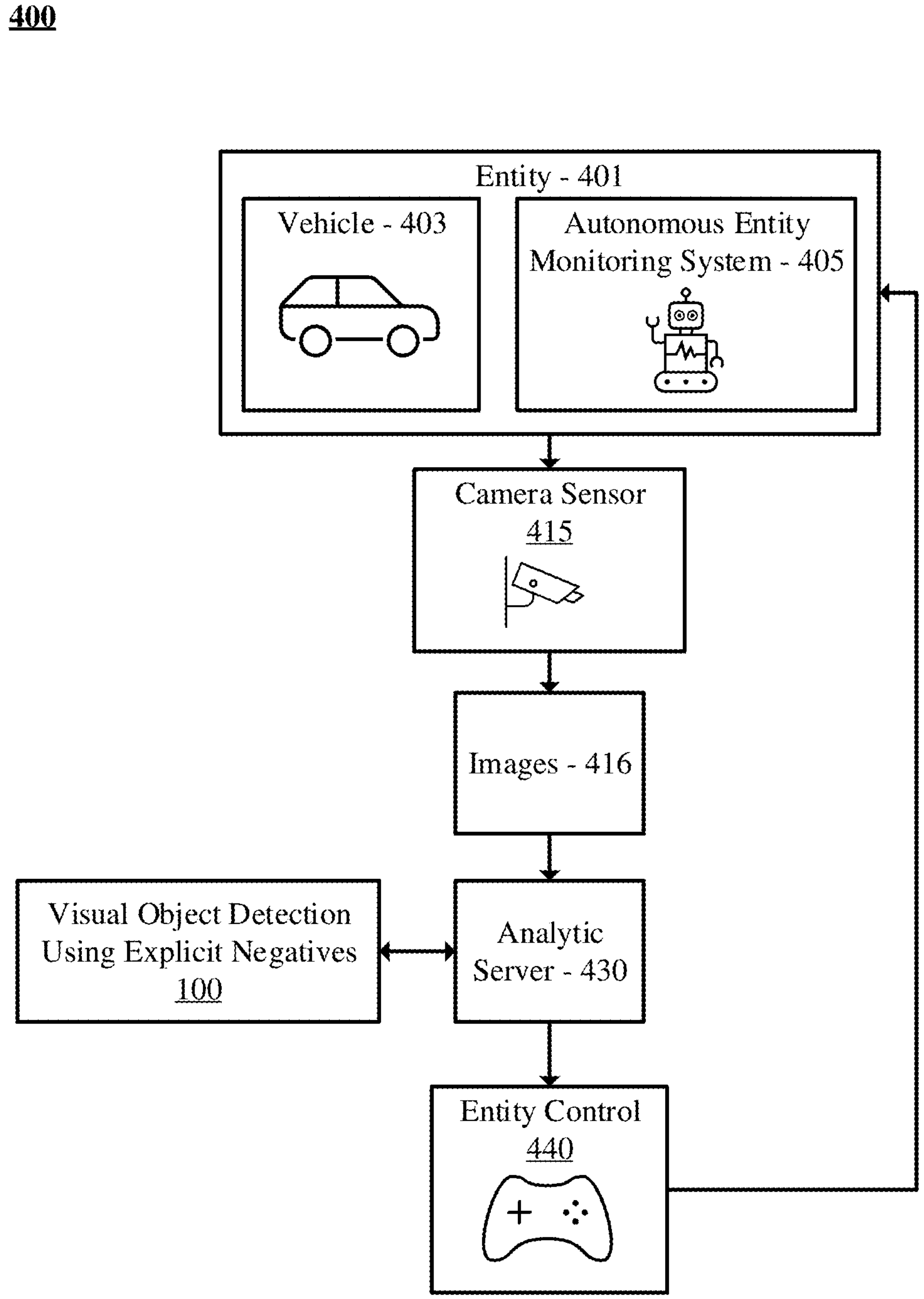
FIG. 4 is a block diagram illustrating a system implementing practical applications for visual object detection using explicit negatives, in accordance with an embodiment of the present invention.

Referring now to FIG. 4, a system implementing practical applications for visual object detection using explicit negatives is illustratively depicted in accordance with an embodiment of the present invention.

In an embodiment, the entity 401 (e.g., vehicle, drone, etc.) can include the camera sensor 415 which can collect input images 416 in a streaming manner and an entity control 440 can be generated by an analytic server 430 included within the entity 401.

In another embodiment, the camera sensor 415 can be placed on a fixed location, separate from the entity, where the entity 401 can be observed. In another embodiment, the analytic server 430 can be placed in a different location and images 416, can be sent over through a network. The analytic server 430 can implement visual object detection using explicit negatives 100 to generate an entity control 440 based on a processed scene from the images 416.

In an embodiment, an autonomous entity monitoring system 405 (e.g., robot, drone, camera system, etc.) can be controlled with an entity control 440 based on the processed scene from the images 416 to monitor monitored entities (e.g., people, patients, healthcare professionals) within a location (e.g., hospital ward, buildings, airports, etc.). The entity control 440 can include instructions to the controlling mechanism to perform an action (e.g., moving, dispensing medicine, etc.).

In another embodiment, a vehicle 403 can be controlled by the entity control 440 based on the processed scene from the images 416. The entity control 440 can include instructions to the controlling mechanism (e.g., advanced driver assistance system [ADAS]) to perform an action (e.g., steering, changing directions, braking, moving forward, etc.) for the vehicle 403.

In another embodiment, an autonomous entity monitoring system can generate a third dimensional (3D) scene based on the processed scene from the images 416 that can assist the decision-making process of a decision-making entity. For example, in a traffic scene, the 3D scene can show the current traffic scene on a display. The 3D scene can be used by a trajectory generation module that can generate trajectories for a vehicle and aid the driving decisions (e.g., decision making process) of the driver (e.g., decision-making entity). In another embodiment, the 3D scene can be employed by road maintenance entities to determine the road conditions and severity of defects within the road based on the 3D scene.

The present embodiments can be employed to other fields such as public service, education, legal, finance, etc.

Generating negatives as contradicting sentences to the positive label is beneficial to AI models because the negatives are typically more complicated to discriminate than the negative descriptions that prior works use, thus, improving accuracy and efficiency of the AI models. By retaining the semantic relevance of the contradicting words of the explicit negatives, the negatives would be harder to discriminate from the positive labels which in turn, improves the accuracy and efficiency of the AI models for visual object detection.

Figure 2:
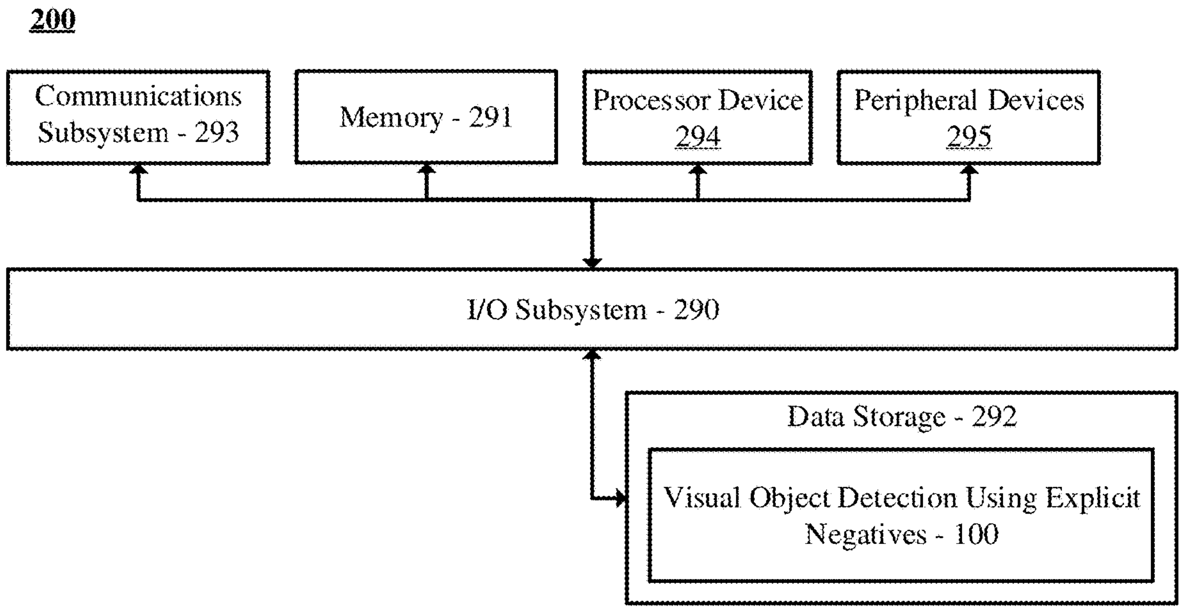
FIG. 2 is a block diagram illustrating a system for visual object detection using explicit negatives, in accordance with an embodiment of the present invention.

Referring now to FIG. 2, a system for visual object detection using explicit negatives is illustratively depicted in accordance with an embodiment of the present invention.

The computing device 200 illustratively includes the processor device 294, an input/output (I/O) subsystem 290, a memory 291, a data storage device 292, and a communication subsystem 293, and/or other components and devices commonly found in a server or similar computing device. The computing device 200 may include other or additional components, such as those commonly found in a server computer (e.g., various input/output devices), in other embodiments. Additionally, in some embodiments, one or more of the illustrative components may be incorporated in, or otherwise form a portion of, another component. For example, the memory 291, or portions thereof, may be incorporated in the processor device 294 in some embodiments.

The processor device 294 may be embodied as any type of processor capable of performing the functions described herein. The processor device 294 may be embodied as a single processor, multiple processors, a Central Processing Unit(s) (CPU(s)), a Graphics Processing Unit(s) (GPU(s)), a single or multi-core processor(s), a digital signal processor (s), a microcontroller(s), or other processor(s) or processing/controlling circuit(s).

The memory 291 may be embodied as any type of volatile or non-volatile memory or data storage capable of performing the functions described herein. In operation, the memory 291 may store various data and software employed during operation of the computing device 200, such as operating systems, applications, programs, libraries, and drivers. The memory 291 is communicatively coupled to the processor device 294 via the I/O subsystem 290, which may be embodied as circuitry and/or components to facilitate input/output operations with the processor device 294, the memory 291, and other components of the computing device 200. For example, the I/O subsystem 290 may be embodied as, or otherwise include, memory controller hubs, input/output control hubs, platform controller hubs, integrated control circuitry, firmware devices, communication links (e.g., point-to-point links, bus links, wires, cables, light guides, printed circuit board traces, etc.), and/or other components and subsystems to facilitate the input/output operations. In some embodiments, the I/O subsystem 290 may form a portion of a system-on-a-chip (SOC) and be incorporated, along with the processor device 294, the memory 291, and other components of the computing device 200, on a single integrated circuit chip.

The data storage device 292 may be embodied as any type of device or devices configured for short-term or long-term storage of data such as, for example, memory devices and circuits, memory cards, hard disk drives, solid state drives, or other data storage devices. The data storage device 292 can store program code for visual object detection using explicit negatives 100. Any or all of these program code blocks may be included in a given computing system.

The communication subsystem 293 of the computing device 200 may be embodied as any network interface controller or other communication circuit, device, or collection thereof, capable of enabling communications between the computing device 200 and other remote devices over a network. The communication subsystem 293 may be configured to employ any one or more communication technology (e.g., wired or wireless communications) and associated protocols (e.g., Ethernet, InfiniBand®, Bluetooth®, Wi-Fi®, WiMAX, etc.) to affect such communication.

As shown, the computing device 200 may also include one or more peripheral devices 295. The peripheral devices 295 may include any number of additional input/output devices, interface devices, and/or other peripheral devices. For example, in some embodiments, the peripheral devices 295 may include a display, touch screen, graphics circuitry, keyboard, mouse, speaker system, microphone, network interface, and/or other input/output devices, interface devices, GPS, camera, and/or other peripheral devices.

Of course, the computing device 200 may also include other elements (not shown), as readily contemplated by one of skill in the art, as well as omit certain elements. For example, various other sensors, input devices, and/or output devices can be included in computing device 200, depending upon the particular implementation of the same, as readily understood by one of ordinary skill in the art. For example, various types of wireless and/or wired input and/or output devices can be employed. Moreover, additional processors, controllers, memories, and so forth, in various configurations can also be utilized. These and other variations of the computing system 200 are readily contemplated by one of ordinary skill in the art given the teachings of the present invention provided herein.

As employed herein, the term "hardware processor subsystem" or "hardware processor" can refer to a processor, memory, software or combinations thereof that cooperate to perform one or more specific tasks. In useful embodiments, the hardware processor subsystem can include one or more data processing elements (e.g., logic circuits, processing circuits, instruction execution devices, etc.). The one or more data processing elements can be included in a central processing unit, a graphics processing unit, and/or a separate processor- or computing element-based controller (e.g., logic gates, etc.). The hardware processor subsystem can include one or more on-board memories (e.g., caches, dedicated memory arrays, read only memory, etc.). In some embodiments, the hardware processor subsystem can include one or more memories that can be on or off board or that can be dedicated for use by the hardware processor subsystem (e.g., ROM, RAM, basic input/output system (BIOS), etc.).

In some embodiments, the hardware processor subsystem can include and execute one or more software elements. The one or more software elements can include an operating system and/or one or more applications and/or specific code to achieve a specified result.

In other embodiments, the hardware processor subsystem can include dedicated, specialized circuitry that performs one or more electronic processing functions to achieve a specified result. Such circuitry can include one or more application-specific integrated circuits (ASICs), field-programmable gate arrays (FPGAs), and/or programmable logic arrays (PLAs).

These and other variations of a hardware processor subsystem are also contemplated in accordance with embodiments of the present invention.

Figure 3:
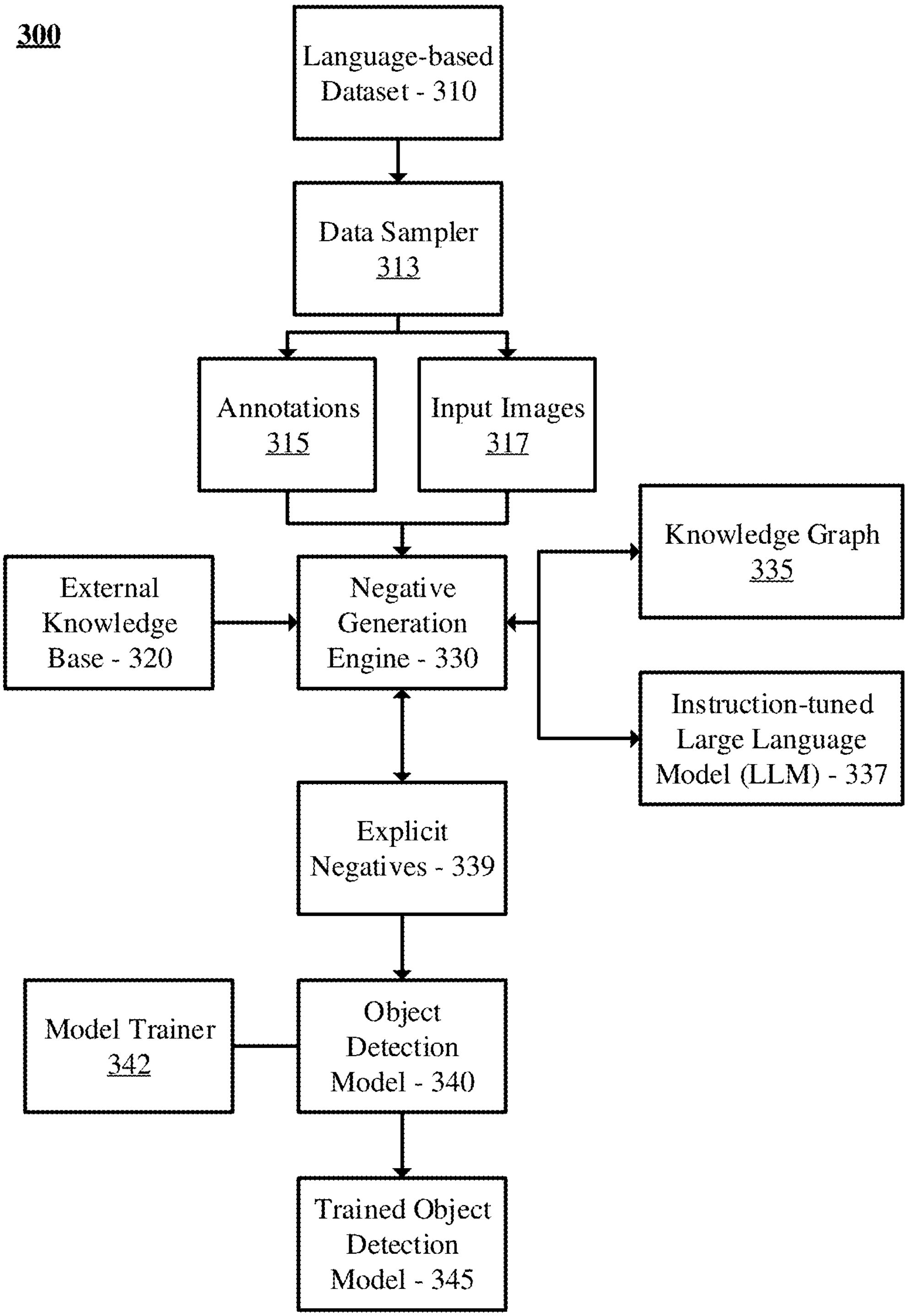
FIG. 3 is a flow diagram illustrating a system having software and hardware components for visual object detection using explicit negatives, in accordance with an embodiment of the present invention.

Referring now to FIG. 3, a system implementing software and hardware components for visual object detection using explicit negatives is illustratively depicted in accordance with an embodiment of the present invention.

In an embodiment, a language-based dataset 310 can be sampled by a data sampler 313 to obtain input images 317 with corresponding annotations 315. The input images 317 and the annotations 315 can be fed to a negative generation engine 330 to generate explicit negatives 339. To generate explicit negatives 339, the negative generation engine 330 can generate a knowledge graph 335 using an external knowledge base and predefined semantic meanings and syntactic rules. In another embodiment, the negative generation engine 330 can generate explicit negatives using an instruction-tuned large language model (LLM) 337 with generated instruction prompts. A model trainer 342 can train an object detection model 340 using the explicit negatives 339, the annotations 315, and the input images 317 to obtain a trained object detection model 345.

The trained object detection model 345 can perform downstream tasks as fine-grained object detection, scene understanding, trajectory generation, entity identification, etc.

Figure 5:
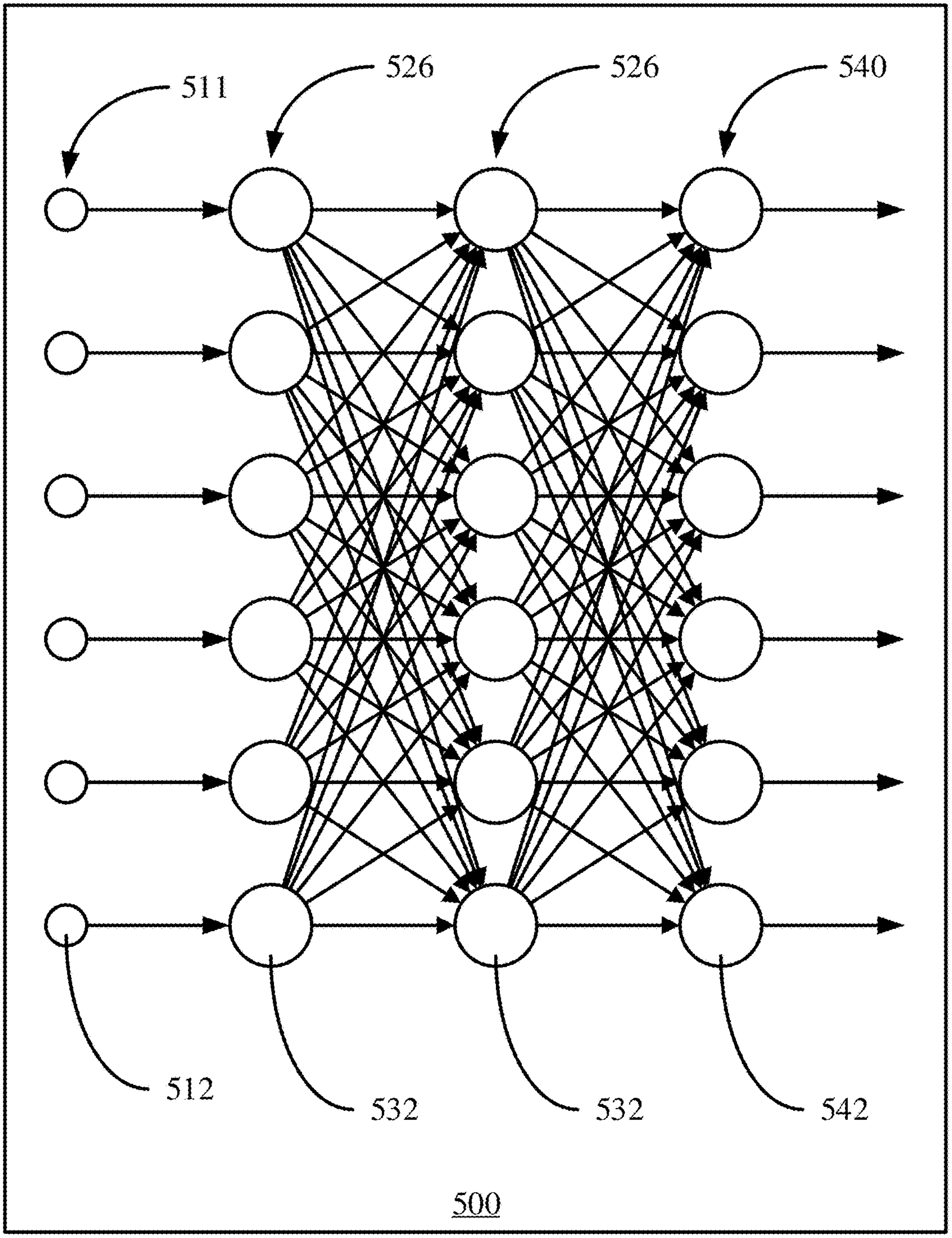
FIG. 5 is a block diagram illustrating deep learning neural networks for visual object detection using explicit negatives, in accordance with an embodiment of the present invention.

Referring now to FIG. 5, a block diagram illustrating deep learning neural networks for visual object detection using explicit negatives, in accordance with an embodiment of the present invention.

A neural network is a generalized system that improves its functioning and accuracy through exposure to additional empirical data. The neural network becomes trained by exposure to the empirical data. During training, the neural network stores and adjusts a plurality of weights that are applied to the incoming empirical data. By applying the adjusted weights to the data, the data can be identified as belonging to a particular predefined class from a set of classes or a probability that the inputted data belongs to each of the classes can be output.

The empirical data, also known as training data, from a set of examples can be formatted as a string of values and fed into the input of the neural network. Each example may be associated with a known result or output. Each example can be represented as a pair, (x, y), where x represents the input data and y represents the known output. The input data may include a variety of different data types and may include multiple distinct values. The network can have one input neurons for each value making up the example's input data, and a separate weight can be applied to each input value. The input data can, for example, be formatted as a vector, an array, or a string depending on the architecture of the neural network being constructed and trained.

The neural network "learns" by comparing the neural network output generated from the input data to the known values of the examples and adjusting the stored weights to minimize the differences between the output values and the known values. The adjustments may be made to the stored weights through back propagation, where the effect of the weights on the output values may be determined by calculating the mathematical gradient and adjusting the weights in a manner that shifts the output towards a minimum difference. This optimization, referred to as a gradient descent approach, is a non-limiting example of how training may be performed. A subset of examples with known values that were not used for training can be used to test and validate the accuracy of the neural network.

During operation, the trained neural network can be used on new data that was not previously used in training or validation through generalization. The adjusted weights of the neural network can be applied to the new data, where the weights estimate a function developed from the training examples. The parameters of the estimated function which are captured by the weights are based on statistical inference.

The deep neural network 500, such as a multilayer perceptron, can have an input layer 511 of source neurons 512, one or more computation layer(s) 526 having one or more computation neurons 532, and an output layer 540, where there is a single output neuron 542 for each possible category into which the input example could be classified. An input layer 511 can have a number of source neurons 512 equal to the number of data values 512 in the input data 511. The computation neurons 532 in the computation layer(s) 526 can also be referred to as hidden layers, because they are between the source neurons 512 and output neuron(s) 542 and are not directly observed. Each neuron 532, 542 in a computation layer generates a linear combination of weighted values from the values output from the neurons in a previous layer, and applies a non-linear activation function that is differentiable over the range of the linear combination. The weights applied to the value from each previous neuron can be denoted, for example, by $w_1, w_2, \ldots w_{n-1}, w_n$. The output layer provides the overall response of the network to the inputted data. A deep neural network can be fully connected, where each neuron in a computational layer is connected to all other neurons in the previous layer, or may have other configurations of connections between layers. If links between neurons are missing, the network is referred to as partially connected.

In an embodiment, the computation layers 526 of trained object detection model 345 can learn relationships between bounding boxes of an input image 317 with ground truth bounding boxes by using the explicit negatives 339. The output layer 540 of the trained object detection model 345 can then provide the overall response of the network as a likelihood score of the bounding box and a correct label of a category of an object within the input image 317. In another embodiment, the trained object detection model 345 can be employed to generate trajectories for a vehicle based on a traffic scene simulated from input images 416.

Training a deep neural network can involve two phases, a forward phase where the weights of each neuron are fixed and the input propagates through the network, and a backwards phase where an error value is propagated backwards through the network and weight values are updated. The computation neurons 532 in the one or more computation (hidden) layer(s) 526 perform a nonlinear transformation on the input data 512 that generates a feature space. The classes or categories may be more easily separated in the feature space than in the original data space.

Reference in the specification to "one embodiment" or "an embodiment" of the present invention, as well as other variations thereof, means that a particular feature, structure, characteristic, and so forth described in connection with the embodiment is included in at least one embodiment of the present invention. Thus, the appearances of the phrase "in one embodiment" or "in an embodiment", as well any other variations, appearing in various places throughout the specification are not necessarily all referring to the same embodiment. However, it is to be appreciated that features of one or more embodiments can be combined given the teachings of the present invention provided herein.

It is to be appreciated that the use of any of the following "/", "and/or", and "at least one of", for example, in the cases of "A/B", "A and/or B" and "at least one of A and B", is intended to encompass the selection of the first listed option (A) only, or the selection of the second listed option (B) only, or the selection of both options (A and B). As a further example, in the cases of "A, B, and/or C" and "at least one of A, B, and C", such phrasing is intended to encompass the selection of the first listed option (A) only, or the selection of the second listed option (B) only, or the selection of the third listed option (C) only, or the selection of the first and the second listed options (A and B) only, or the selection of the first and third listed options (A and C) only, or the selection of the second and third listed options (B and C) only, or the selection of all three options (A and B and C). This may be extended for as many items listed.

The foregoing is to be understood as being in every respect illustrative and exemplary, but not restrictive, and the scope of the invention disclosed herein is not to be determined from the Detailed Description, but rather from the claims as interpreted according to the full breadth permitted by the patent laws. It is to be understood that the embodiments shown and described herein are only illustrative of the present invention and that those skilled in the art may implement various modifications without departing from the scope and spirit of the invention. Those skilled in the art could implement various other feature combinations without departing from the scope and spirit of the invention. Having thus described aspects of the invention, with the details and particularity required by the patent laws, what is claimed and desired protected by Letters Patent is set forth in the appended claims.

What is claimed is:

1. A computer-implemented method for visual object detection using explicit negatives, comprising:

sampling images with annotations from a language-based dataset using a data sampler;

generating, using a negative generation engine, explicit negatives representing sentences that include contradicting words that are semantically related to the annotations by using an external knowledgebase;

minimizing a classification loss of positive labels while decreasing a confidence score of the explicit negatives for an artificial intelligence model;

backpropagating using the positive labels and next explicit negatives generated by an optimized negative generation engine to generate supervisory loss corresponding to the next explicit negatives for the artificial intelligence model; and detecting objects from an input image using the artificial intelligence model.

2. The computer-implemented method of claim 1, further comprising controlling a vehicle based on a generated trajectory that considers detected objects for a traffic scene simulated using the artificial intelligence model.

3. The computer-implemented method of claim 1, wherein generating the explicit negatives further comprises generating contradicting sentences using a constructed instruction prompt for a large language model (LLM).

4. The computer-implemented method of claim 1, wherein generating the explicit negatives further comprises constructing a knowledge graph of contradicting words that retains semantic relevance with the annotations using the external knowledgebase.

5. The computer-implemented method of claim 4, wherein constructing the knowledge graph further comprises applying part-of-speech tagging to determine the classification of input words.

6. The computer-implemented method of claim 1, wherein minimizing the classification loss further comprises computing logits from a dot product of visual and text features.

7. The computer-implemented method of claim 6, wherein minimizing the classification loss further comprises minimizing a cross-entropy loss of the logits and ground truth classes from the annotations.

8. A system for visual object detection using explicit negatives, comprising:

a memory device; and one or more processor devices operatively coupled with the memory device to:

sample images with annotations from a language-based dataset using a data sampler;

generate, using a negative generation engine, explicit negatives representing sentences that include contradicting words that are semantically related to the annotations by using an external knowledgebase;

minimize a classification loss of positive labels while decreasing a confidence score of the explicit negatives for an artificial intelligence model;

backpropagate using the positive labels and next explicit negatives generated by an optimized negative generation engine to generate supervisory loss corresponding to the next explicit negatives for the artificial intelligence model; and detect objects from an input image using the artificial intelligence model.

9. The system of claim 8, further comprising to control a vehicle based on a generated trajectory that considers detected objects for a traffic scene simulated using the artificial intelligence model.

10. The system of claim 8, wherein to generate the explicit negatives further comprises generating contradicting sentences using a constructed instruction prompt for a large language model (LLM).

11. The system of claim 8, wherein to generate the explicit negatives further comprises constructing a knowledge graph of contradicting words that retains semantic relevance with the annotations using the external knowledgebase.

12. The system of claim 11, wherein constructing the knowledge graph further comprises applying part-of-speech tagging to determine the classification of input words.

13. The system of claim 8, wherein to minimize the classification loss further comprises computing logits from a dot product of visual and text features.

14. The system of claim 13, wherein to minimize the classification loss further comprises minimizing a cross-entropy loss of the logits and ground truth classes from the annotations.

15. A non-transitory computer program product comprising a computer-readable storage medium including program code for visual object detection using explicit negatives, wherein the program code when executed on a computer causes the computer to:

sample images with annotations from a language-based dataset using a data sampler;

generate, using a negative generation engine, explicit negatives representing sentences that include contradicting words that are semantically related to the annotations by using an external knowledgebase;

minimize a classification loss of positive labels while decreasing a confidence score of the explicit negatives for an artificial intelligence model;

backpropagate using the positive labels and next explicit negatives generated by an optimized negative generation engine to generate supervisory loss corresponding to the next explicit negatives for the artificial intelligence model; and detect objects from an input image using the artificial intelligence model.

16. The non-transitory computer program product of claim 15, further comprising to control a vehicle based on a generated trajectory that considers detected objects for a traffic scene simulated using the artificial intelligence model.

17. The non-transitory computer program product of claim 15, wherein to generate the explicit negatives further comprises generating contradicting sentences using a constructed instruction prompt for a large language model (LLM).

18. The non-transitory computer program product of claim 15, wherein to generate the explicit negatives further comprises constructing a knowledge graph of contradicting words that retains semantic relevance with the annotations using the external knowledgebase.

19. The non-transitory computer program product of claim 18, wherein constructing the knowledge graph further comprises applying part-of-speech tagging to determine the classification of input words.

20. The non-transitory computer program product of claim 15, wherein to minimize the classification loss further comprises minimizing a cross-entropy loss of logits from a dot product of visual and text features and ground truth classes from the annotations.

* * * * *